United States Patent

[11] 3,620,702

| [72] | Inventors | Arthur DeKalb |
| | | Danville, Va.; |
| | | Alan G. Whitney, Corning, N.Y. |
| [21] | Appl. No. | 871,839 |
| [22] | Filed | Oct. 28, 1969 |
| [45] | Patented | Nov. 16, 1971 |
| [73] | Assignee | Corning Glass Works |
| | | Corning, N.Y. |

[54] PROCESS IMPROVEMENT FOR MANUFACTURING HIGH-PURITY QUARTZ FORMS
3 Claims, 3 Drawing Figs.

[52] U.S. Cl. .................................................. 65/18, 65/33, 65/120, 65/134
[51] Int. Cl. .................................................. C03b 23/20, C03b 25/00
[50] Field of Search .......................... 65/33, 120, 134, 18

[56] References Cited
UNITED STATES PATENTS

| 1,778,305 | 10/1930 | Blau .............................. | 65/120 X |
| 2,726,487 | 12/1955 | Cummins et al. ............... | 65/120 X |
| 2,992,903 | 7/1961 | Imber ............................ | 65/33 X |
| 3,113,877 | 12/1963 | Janakirawa-Rao ............ | 65/33 X |
| 3,116,137 | 12/1963 | Vasilos et al. ................. | 65/33 X |
| 3,177,057 | 4/1965 | Potter et al. ................... | 65/33 X |
| 3,298,553 | 1/1967 | Lusher .......................... | 65/33 X |
| 3,360,595 | 12/1967 | Wittels .......................... | 65/33 X |
| 3,524,748 | 8/1970 | Beal .............................. | 65/33 X |

Primary Examiner—Frank W. Miga
Attorneys—Clarence R. Patty, Jr. and Ernst H. Ruf ABSTRACT: Improvement during the step of firing a high-purity quartz form whereby the end-supported green quartz form is heated along at least one narrow-band section by a heat source capable of at least attaining the melting point of quartz and the supported form and heat source are moved relative to one another for a time sufficient to completely fire the form. The moving speed may be varied as the firing progresses in order to maintain optimum dimensional stability.

PATENTED NOV 16 1971 3,620,702
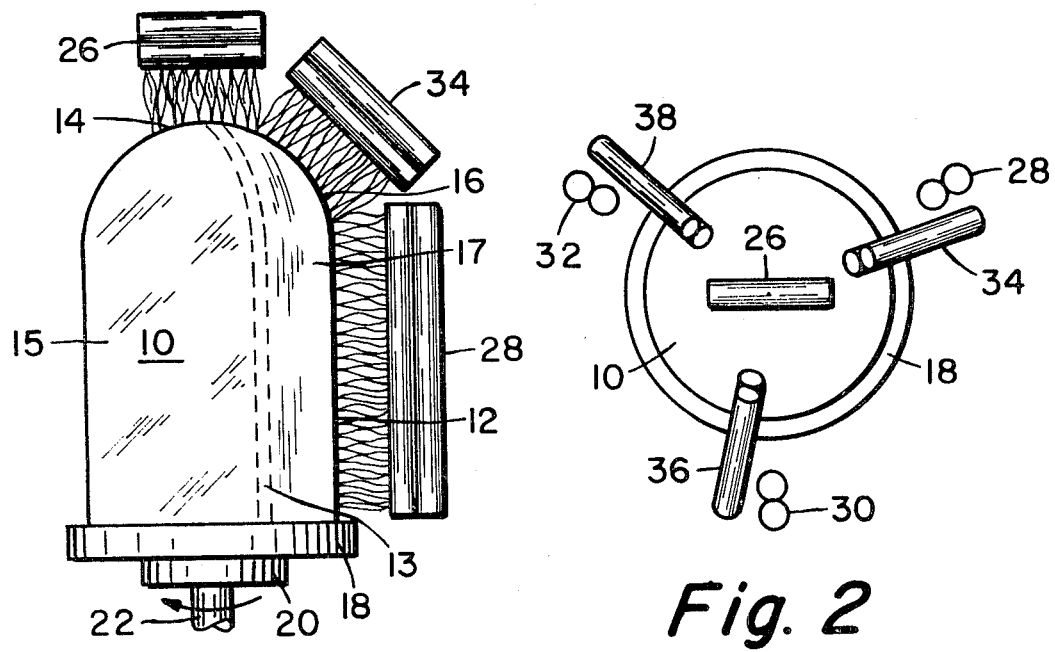
Fig. 1
Fig. 2
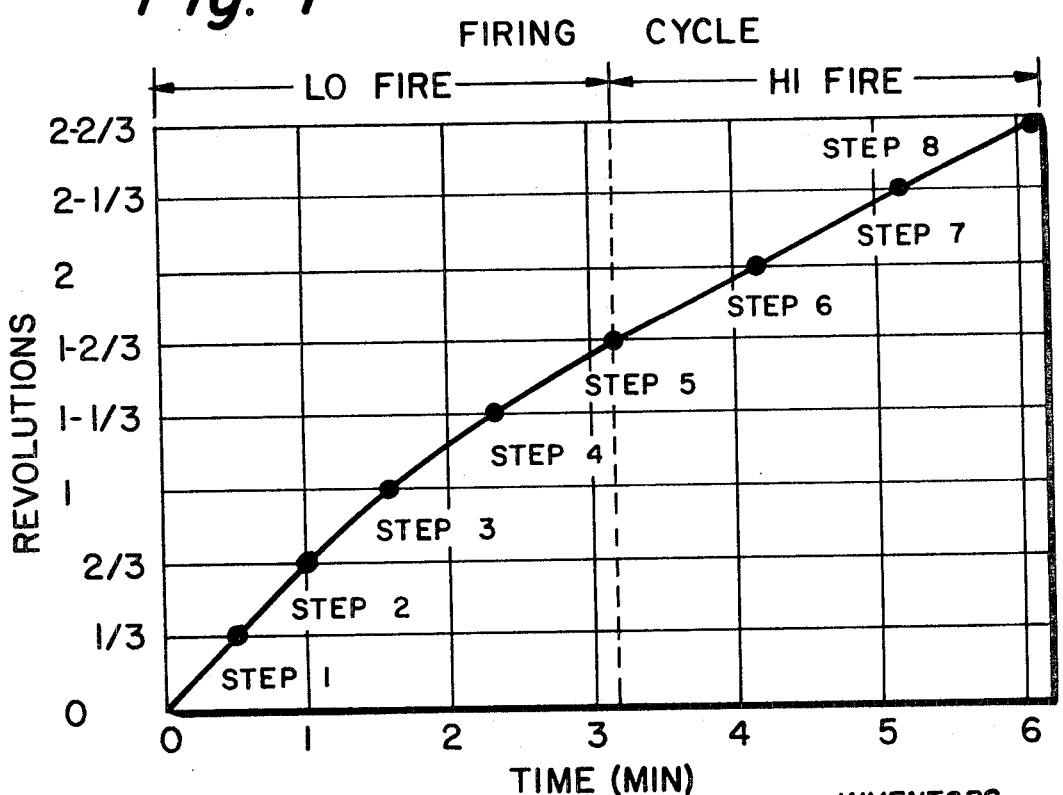
Fig. 3
INVENTORS.
Arthur DeKalb
Alan G. Whitney
BY
Ernst H. Ruf
ATTORNEY 3,620,702

PROCESS IMPROVEMENT FOR MANUFACTURING HIGH-PURITY QUARTZ FORMS

BACKGROUND OF THE INVENTION

While commercial quartz glass forms may be made by a number of different processes, regardless of which process is used, problems have been encountered particularly in making high-purity quartz crucibles for use by the semiconductor industry in the growing of silicon or other crystals. Not only does this use require extremely high purity but also requires tight dimensional tolerances.

One method of producing these quartz crucibles involves the making of green quartz crucibles, generally either by means of slip-casting or isostatic pressing small particles of quartz, which are thereafter fired to achieve fusing into a finished final part.

Conventional kiln firing of the green crucibles is not satisfactory, since during this firing the whole crucible is above its melting point for at least part of the time, which causes slumping and deformation of the crucible form resulting in subsequent loss of dimensional tolerances.

The obvious solution of using a mold or a support form to reinforce the green form during the firing step is also not satisfactory due to the likelihood of contamination problems resulting therefrom.

SUMMARY OF THE INVENTION

This invention solves the previously mentioned problems by only heating at least one narrow-band full-length vertical section of the crucible outside surface to at least its melting point at one time. The crucible is concentrically mounted on a turntable in a closed-end-up position and as it rotates, this narrow-band vertical section in effect travels around the crucible until the form is fully fired. In fusing only narrow-band vertical sections, the molten areas receive sufficient support from the surrounding cooler areas to keep them from deforming. Since the crucible is self-supporting during firing, no slumping occurs and the use of a mold or inside support form is avoided. In addition, by not having to use a mold or form to support the crucible, possible contamination of the finished product is also avoided and the required purity level is maintained.

In summary, this invention relates to a process for manufacturing a high-purity quartz form, the improvement being in the firing step and includes placing the form on an end-support, providing at least one heat source capable of heating at least one narrow-band section of the form to at least its melting point, and moving either the support or the heat source with respect to the other for a time sufficient to completely fire the form, with the moving speed varying to keep the dimensional change from the green stage to the fully fired stage as uniform as possible.

BRIEF DRAWING DESCRIPTION

FIG. 1 is a partial side elevational view of the firing apparatus for practicing the method of this invention.

FIG. 2 is a top view of the firing apparatus for practicing the method of this invention.

FIG. 3 illustrates a typical firing cycle obtainable with the apparatus used for practicing the method of this invention.

DESCRIPTION OF THE PREFERRED EMBODIMENTS

A known process for manufacturing quartz forms, such as quartz crucibles, utilizes the following steps:
1. Washing and drying the quartz tubing cullet,
2. Dry crushing the cullet,
3. Separating the washed cullet according to particle size,
4. Wet grinding the desired size fraction to produce quartz slip,
5. Drain-casting the slip into a mold,
6. Drying the slip cast form,
7. Firing the form,
8. Cooling the fired form, and
9. Post-finishing the fired form.

This known process for manufacturing quartz forms, except for the unique way hereinafter described for firing the quartz forms, is common practice in slip-casting work.

Referring now to the drawings in detail, FIGS. 1 and 2 depict the fusing or firing apparatus for practicing the method of this invention. A slip-cast and dried quartz form, shown in the shape of a crucible 10 having sidewall portion 12, bottom portion 14, and transitional portion 16 joining said side and bottom portions, is end-supported on a refractory plate 18 in a bottom-up positions, i.e., having its longitudinal axis in a vertical position. Refractory plate 18 is positioned on a horizontal turntable 20, rotatable about a vertical axis by means of a drive shaft 22 connected to a suitable variable speed drive means (not shown) of any known construction, such as for example an electric motor. The longitudinal axis of crucible 10 and the vertical axis of turntable 20 should be concentric so that the diameter of the body of revolution resulting from one revolution of crucible 10 is substantially similar to the diameter of crucible 10.

FIGS. 1 and 2 also show the arrangement of the heat sources used for firing crucible 10, namely single top center burner 26, multiple similar side burners 28, 30, 32 and multiple, similar top-side burners 34, 36, 38, with said side and top-side burners being equally spaced from and around crucible 10. Top center burner 26 heats crucible bottom portion 14, side burners 28, 30 and 32 heat crucible side portion 12 and top-side burners 34, 36 and 38 heat crucible transitional portion 16, with all of these burners preferably being natural gas-oxygen surface mix ribbon burners. All burners are preferably spaced between about 0.5 and 1.0 inches from the crucible outside surface, and preferably have an effective flame width of about 0.125 to 0.50 inches.

The following example in conjunction with FIG. 3, which depicts the revolution vs. time for a typical crucible having a 4 inch outside diameter, sets forth the details of the crucible and the apparatus used in practicing the method of this invention.

EXAMPLE

TYPICAL FIRING CYCLE

| | |
|---|---|
| Green (unfired) dimension | 4.300-inch outside diameter |
| Fired dimension | 4-inch outside diameter |
| Wall thickness | 0.070 to 0.100 inches |
| total revolutions | 2¾ |
| Total time | approx. 6 min. 10 sec |
| Burners | 7 Gas-oxygen surface mix |
| Operational steps | 8 = 5 steps-low fire |
| | 3 steps-high fire |

Burner details:

| Burner name and number | Effective burner length, | P.S.I.[1] | | Lo-fire, c.f.h. | | Hi-fire, c.f.h.[2] | |
|---|---|---|---|---|---|---|---|
| | | Gas | O₂ | Gas | O₂ | Gas | O₂ |
| Side No. 28 | 5.5 | 20 | 40 | 40 | 80 | 55 | 110 |
| Side No. 30 | 5.5 | 20 | 40 | 40 | 80 | 55 | 110 |
| Side No. 32 | 5.5 | 20 | 40 | 40 | 80 | 55 | 110 |
| Top-side No. 34 | 2.5 | 20 | 40 | 18 | 36 | 25 | 50 |
| Top-side No. 36 | 2.5 | 20 | 40 | 18 | 36 | 25 | 50 |
| Top-side No. 38 | 2.5 | 20 | 40 | 18 | 36 | 25 | 50 |
| Top-center No. 26 | 1.0 | 20 | 40 | 7.5 | 15 | 10 | 20 |

[1] P.s.i.=pounds per square inch.
[2] c.f.h.=cubic feet per hour.
NOTE.—Sufficient firing is accomplished when a density of approximately 2.2 is reached on fired crucible.

The same basic steps shown in FIG. 3, namely five low-fire steps and three high-fire or fusing steps are followed for each crucible size, with smaller sizes requiring less overall time and larger sizes requiring more overall time. It should be noted that FIG. 2, in addition to top center burner 26, shows three pairs of side and top-side burners, namely 28 and 34, 30 and 36, as well as 32 and 38, spaced 120° apart. Each pair of burners is set as identically as possible for fire power and dimensional uniformity of position, one to another. By this burner positioning, each one-third of a revolution of crucible 10 is effectively a full revolution, i.e., at any one setting of revolutions per minute, one-third of a revolution will present all points on the crucible to the same intensity of heat.

As previously noted the effective flame width of the burners preferably is in the range from 0.125 to 0.50 inches, therefore the heating of the crucible surface is in narrow-band vertical sections such as section 13 schematically shown in FIG. 1. As turntable 20 rotates, one or more of these narrow-band sections effectively travels around the crucible, as schematically indicated at 15, until the green form, as schematically indicated at 17, is fully fired. It should be noted that for illustrative purposes, sections 13, 15 and 17 are all displaced from their true positions. Section 13, in actual practice, is in line with burners 26, 28 and 34, with sections 15 and 17 respectively leading and trailing section 13.

As best seen in FIG. 3 there is a stepped decrease in rotational speed as the firing cycle progresses. The reason for this speed decrease is to keep the dimensional shrinkage of crucible 10 from the green stage to the fully fired stage as uniform as possible, with the total dimensional shrinkage being about 8 percent. In its fully fired stage, the density of crucible 10 is very close to the theoretical density of fused quartz (approx. 2.18 g./cc. vs. 2.20 g./cc.). It has been determined that this stepped, i.e. gradual, reduction of the crucible in size from the green dimension to the fully fired dimension is extremely important in the attaining of good dimensional accuracy, particularly in obtaining the desired outside diameter and the required roundness, as well as controlling shrinkage.

The change from low-fire to high-fire heating is made in order to speed up the overall firing cycle. About 70 percent of the dimensional shrinkage has been accomplished by the end of step 5, therefore the added heating during steps 6–8 can be controlled so as to produce a crucible without obtaining dimensional distortions. It should be noted that during the low-fire steps, namely steps 1 to 5 inclusive, the temperature of narrow-band vertical sections 13 is below the melting point of quartz, while during the high-fire or fusing steps, namely steps 6 to 8 inclusive, the temperature of narrow-band vertical sections 13 is approximately at or above the melting point of quartz. At the turntable speed and burner flow rates occuring during fusing steps 6 to 8, as previously noted, narrow-band vertical sections 13 are the only portions of crucible 10 that are at or above its melting temperature. If the whole crucible were above its melting temperature, it would obviously slump and deform. Thus, by fusing only one or more narrow-band vertical sections 13, these melted sections receive sufficient support from the surrounding cooler areas, i.e., already fused area 15 and still-green area 17, to keep melted sections 13 from sagging. As the turntable rotates, melted sections 13 in effect travel around the crucible until the crucible is fully fused or fired. As the firing cycle progresses through its eight steps the rotational speed is decreased in order to attain good dimensional stability control shrinkage.

Since the quartz forms or crucibles fired according to the method of this invention are self-supporting during firing, no slumping or collapsing occurs and the use of a mold or a support form on the inside thereof is avoided. In not having to use a mold to support the crucible, possible contamination of the inner surface is avoided and the purity level required by the semiconductor industry for the growing of silicon or other crystals is obtained and maintained. It should be noted that during the post-finishing operation the annular portion of crucible 10 which was in direct contact with refractory plate 18 is removed in order to eliminate any possible chance of contamination therefrom.

Furthermore, the method of this invention is not limited to crucibles but may also readily be used to produce other quartz forms having generally symmetrical shapes, such as for example tubes, rods, or cylinders just to name a few. In addition, this unique firing step improvement may be utilized on any green quartz form regardless of its production method, be it slip-casting, extrusion, pressing or the like. Heat sources other than gas-oxygen burners may also be utilized and the heating of the quartz forms is not restricted to external surface heating.

While this invention has been described in connection with possible forms or embodiment thereof, it is to be understood that the present disclosure is illustrative rather than restrictive and that changes or modifications may be resorted to without departing from the spirit of the invention.

We claim:

1. In a process for manufacturing a high-purity amorphous quartz crucible, having the initial steps of washing, drying, crushing, screening, and milling quartz cullet to produce a quartz slip which is subsequently processed from a slip-cast green quartz crucible into a fused amorphous quartz crucible by the process steps of drain casting, drying, firing, cooling and post-finishing, the improvement comprising, during the step of firing, the substeps of:

a. supporting said crucible on one end only by placing said crucible in a bottom-end-up position on an end support while maintaining the inner surface of said crucible free from supporting contacts and thereby avoid contamination due to contact;

b. initially heating the bottom outside surface portion of said crucible and at least one full-length, narrow-band, generally vertical section of said crucible outside surface with at least one heat source to a temperature below the melting point of amorphous quartz;

c. relatively rotating said support and said heat source with respect to one another until the entire outside surface area of said crucible is presented at least once to said heat source during said initial heating step;

d. finally heating the bottom outside surface portion of said crucible and at least one full-length, narrow-band, generally vertical section of said crucible outside surface with said at least one heat source to at least the melting point of amorphous quartz; and e. relatively rotating said support and said heat source with respect to one another until the entire outside surface area of said crucible is presented at least once to said heat source during said final heating step and said crucible is thereby completely fused.

2. The process of claim 1 wherein said heat source comprises one top center burner for heating the central bottom portion of said crucible, multiple side burners for heating the side portion of said crucible and multiple top-side burners for heating the transitional portion joining said bottom and side portions of said crucible, said multiple side and top-side burners being generally aligned and equally spaced from and around said crucible; and said narrow-band vertical section ranges from 0.125 to 0.50 inches in width.

3. The process of claim 1 with the additional step of decreasing said rotational speed between said initial and final heating steps, in order to keep the dimensional shrinkage of said crucible from the slip-cast green stage to the completely fused amorphous quartz stage as uniform as possible, with about 70 percent of the dimensional shrinkage occurring during said initial heating step.

* * * * *